United States Patent [19]
Sutton, Jr. et al.

[11] 3,944,870
[45] Mar. 16, 1976

[54] DEGAUSSING CIRCUIT FOR COLOR TELEVISION RECEIVERS

[75] Inventors: Walter T. Sutton, Jr.; James B. Sims, both of Lexington, Ky.

[73] Assignee: Texas Instruments Incorporated, Dallas, Tex.

[22] Filed: Feb. 11, 1971

[21] Appl. No.: 114,689

Related U.S. Application Data

[62] Division of Ser. No. 689,023, Dec. 8, 1967, abandoned.

[52] U.S. Cl. .......................... 315/8; 317/157.5 TV
[51] Int. Cl.² ..................... H01J 29/07; H01F 13/00
[58] Field of Search ..................... 317/157.5; 315/8

[56] References Cited
UNITED STATES PATENTS

| | | | |
|---|---|---|---|
| 2,942,162 | 6/1960 | Becker | 317/132 X |
| 3,249,795 | 5/1966 | Dietch | 315/8 |
| 3,333,143 | 7/1967 | Anrooy et al. | 315/8 |
| 3,340,443 | 9/1967 | Rieth et al. | 315/8 X |
| 3,356,889 | 12/1967 | Merkl et al. | 315/8 |
| 3,486,080 | 12/1969 | Tillmann | 317/132 |
| 3,495,136 | 2/1970 | Gerritsen et al. | 315/8 X |

*Primary Examiner*—Robert Segal
*Attorney, Agent, or Firm*—James P. McAndrews; John A. Haug; Russell E. Baumann

[57] ABSTRACT

A color television receiver having degaussing coil means which are energizable by an alternating current source and which are disposed in demagnetizing relation to magnetically permeable materials in receiver components such as the receiver picture tube is shown to include resistor means of positive temperature coefficient of resistivity in series with the degaussing coil means. The resistor means are self-heating when energized and display progressively increasing resistance as resistor temperature increases, the resistor means further displaying a sharp or anomolous increase in resistance when resistor temperature increases to a selected level. Preferably, relay means responsive to this increase in temperature of the resistor are connected in parallel with the degaussing coil means to shunt the degaussing coil means as resistor temperature increases to said selected level. The receiver circuit is arranged so that each actuation of the receiver from a cold start energizes the degaussing coil and resistor means to establish a magnetic field, subsequent heating of the resistor means progressively reducing degaussing coil current to reduce the magnetic field to substantially zero in a cyclical manner, thereby to demagnetize the receiver picture tube. Where used, the relay means respond to increase in resistor temperature to said selected level to shunt the degaussing coil means after the picture tube is demagnetized. A relay which incorporates the resistor means, relay contact means movable in response to resistor temperature, and appropriate terminals for connecting the relay in a television receiver circuit is also shown.

7 Claims, 12 Drawing Figures

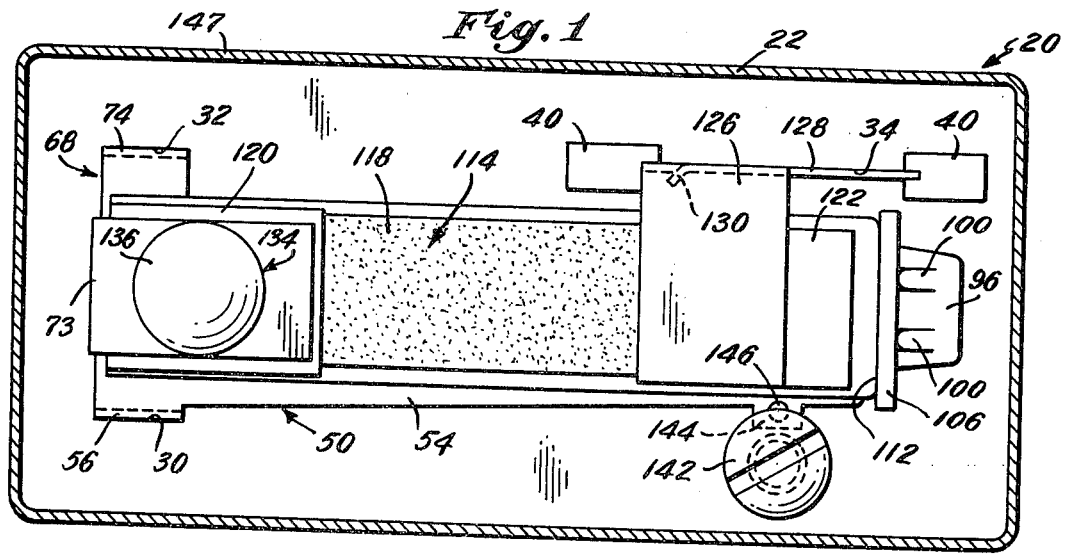
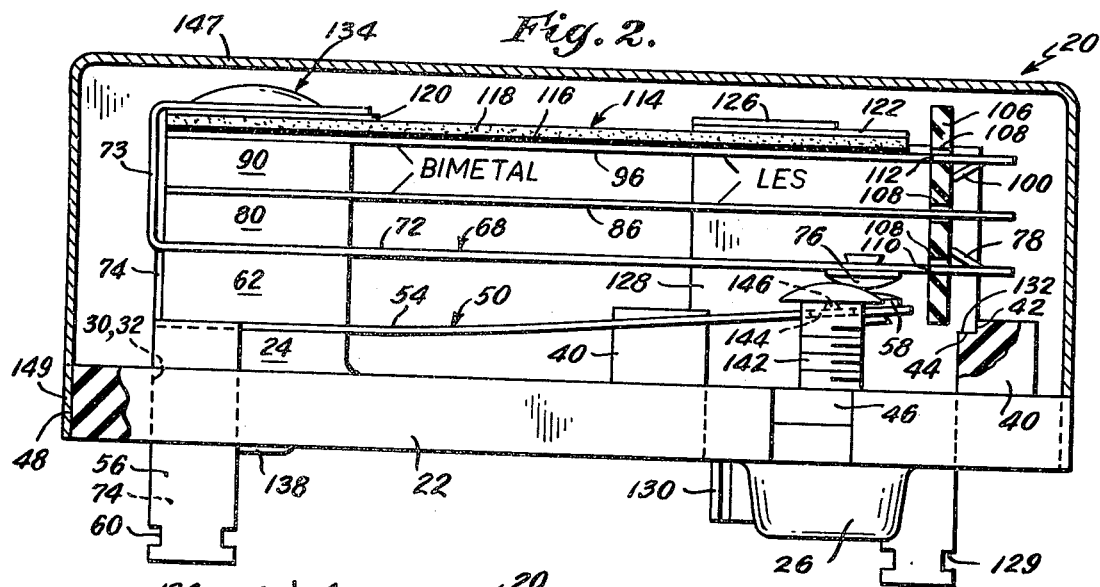
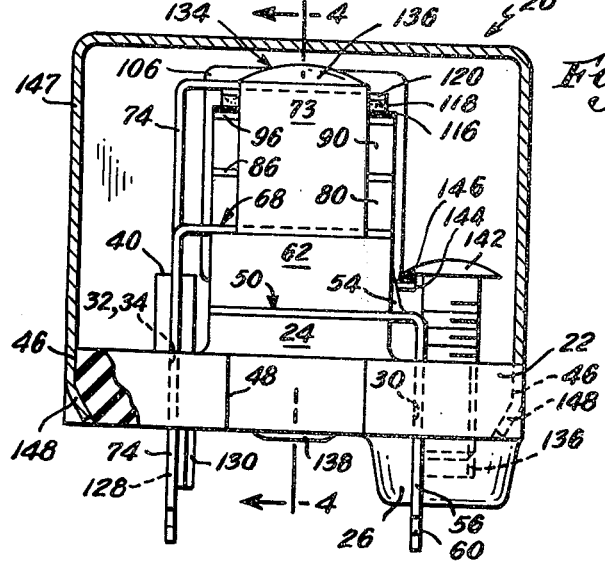
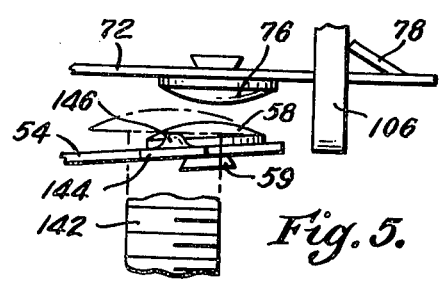

DEGAUSSING CIRCUIT FOR COLOR TELEVISION RECEIVERS

This application is a division of application Ser. No. 689,023, filed Dec. 8, 1967, and now abandoned.

Color television receivers are susceptible to effects of the earth's magnetic field and other stray magnetic fields and must ordinarily be demagnetized when the receiver is originally installed or moved to a different location. For this reason, color television receivers usually incorporate degaussing coils which are arranged to demagnetize magnetically permeable materials in the receiver picture tube and the like, demagnetization being accomplished by energizing the degaussing coils from an alternating current source to establish a magnetic field and by progressively reducing degausssing coil current to substantially zero for progressively reducing the magnetic field in a cyclical manner. Such receivers also include means for shunting the degaussing coils after demagnetization of the receiver picture tube has been completed.

In color television receivers incorporating vacuum tubes, inrush currents in the receiver circuitry are initially high but rapidly decay to much lower levels within a few seconds. These inrush currents are therefore used to energize the degaussing coils in the desired manner, and conventional relays are embodied in the receivers for shunting the degaussing coils after demagnetization of the receiver picture tubes has been completed. In the more recently developed instant-on color television receivers, however, initially high inrush currents have not been inherently available in the receiver circuits. As a result, rather eleborate means have been required to provide the degaussing coils with the desired decaying alternating current, and relay means used for subsequently shunting the degaussing coils have also been somewhat complex and expensive.

It is an object of this invention to provide a color television receiver circuit incorporating novel circuit features adapted to degauss magnetically permeable receiver components such as the receiver picture tube; to provide such a circuit in which the receiver picture tube is automatically degaussed each time that the receiver is actuated from a cold start; to provide an instant-on color television receiver in which the receiver picture tube is automatically degaussed each time that the receiver is actuated from a cold start; to provide such a circuit in which the circuit components adapted to accomplish said degaussing are of simple and inexpensive construction; to provide such a circuit in which said degaussing is performed in a rapid and economical manner; and to provide such a circuit in which the degaussing components of the circuit have a long service life.

It is also an object of this invention to provide a novel and improved relay for use in degaussing color television receivers; to provide such a relay which is adapted for use in color television receivers of various types; to provide such a relay which is especially adapted for use in instant-on color television receivers; to provide such a relay incorporating self-heating resistor means which serve to regulate current in degaussing coils in color television receivers and which also serve to actuate thermally-responsive means for shunting the degaussing coils after a selected period of time; and to provide such a relay which is of simple, rugged and inexpensive construction.

Other objects, advantages and details of construction of the color television receiver circuit and relay of this invention appear in the following detailed description of preferred embodiments of the invention, the detailed description referring to the drawings in which:

FIG. 1 is a plan view of a preferred embodiment of the relay of this invention showing the relay with its cover removed;

FIG. 2 is a front elevation view of the relay of FIG. 1 showing the relay cover in section;

FIG. 3 is an end elevation view of the relay of FIG. 1 showing the relay cover in section;

FIG. 5 is a partial view, to enlarged scale, similar to FIG. 1 illustrating calibration of the relay of FIG. 1;

Figure 7:
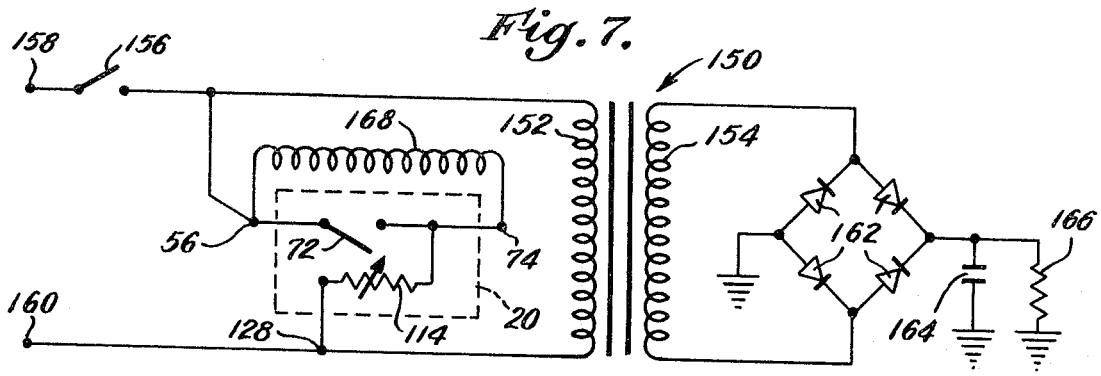
FIGS. 7 and 8 are schematic diagrams illustrating use of the relay of FIGS. 1-6 in the color television receiver circuit of this invention.
Figure 8:
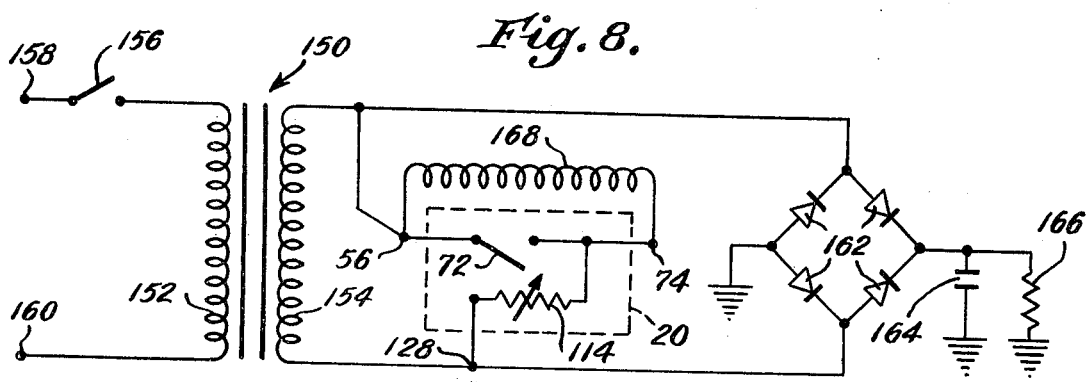
Figure 9:
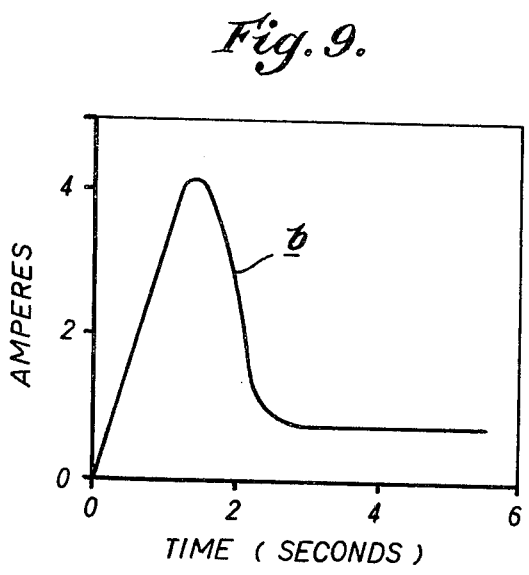
Figure 10:
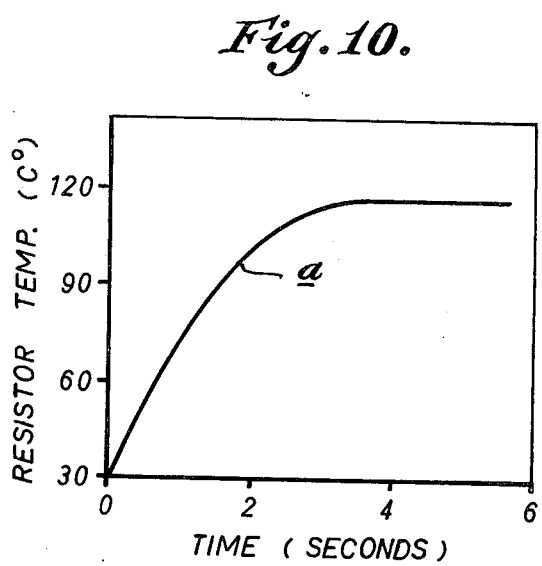
Figure 11:
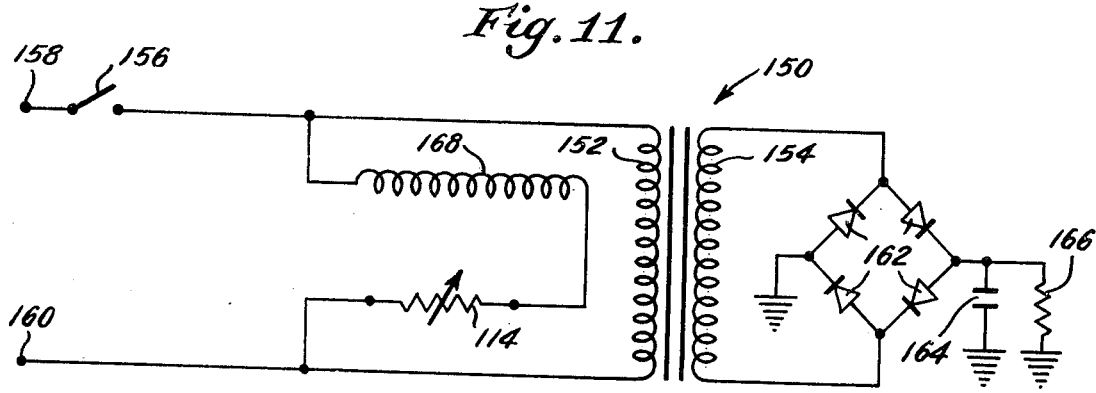
Figure 12:
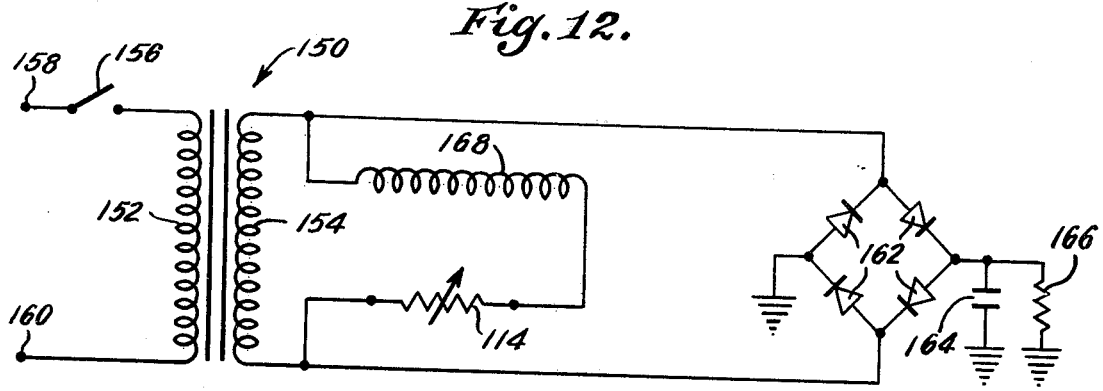

FIGS. 9 and 10 are graphs illustrating operating characteristics of the relays of FIGS. 1-6; and FIGS. 11 and 12 are schematic diagrams similar to FIGS. 7 and 8 illustrating alternate embodiments of the color television receiver circuit of this invention.

In conventional color television receivers, chassis members, picture tube shadow masks and the like are usually formed of magnetically permeable materials. As a result, the receivers are susceptible to effects of the earth's magnetic field or other stray magnetic fields so that, when the receivers are initially installed or are moved from one location to another, residual magnetic effects must be removed from the permeable receiver materials to assure proper formation of the electron images provided by the receivers. In accordance with this invention, novel and improved means are incorporated in an otherwise conventional color television receiver circuit, such as the circuit of an instant-on television receiver, to provide automatic degaussing of the color television receiver each time that the receiver is actuated from a cold start.

Figure 6:
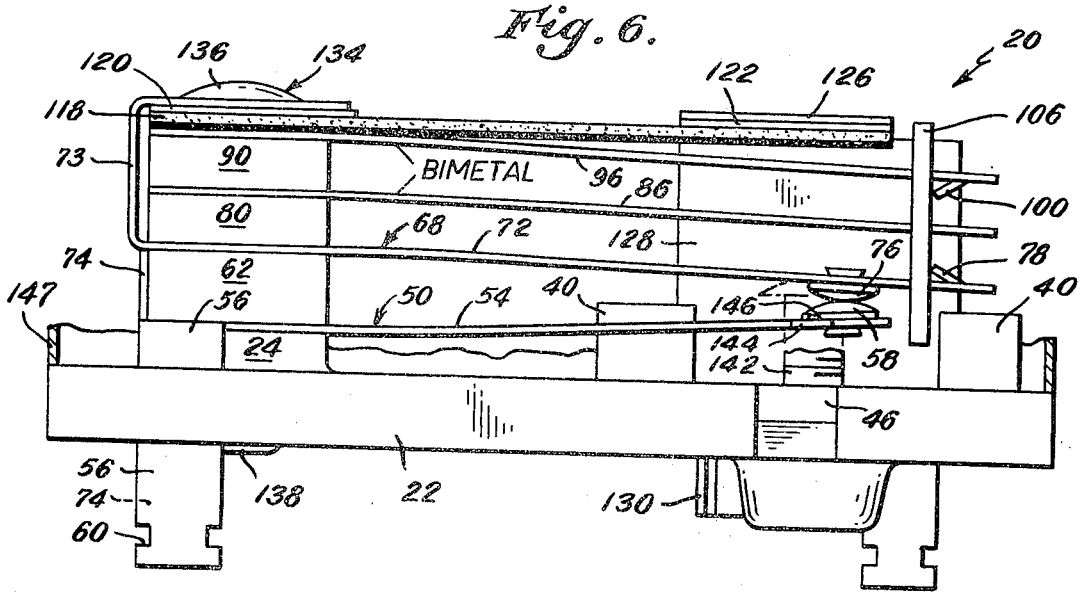
FIG. 6 is a front elevation view of the relay of FIG. 1 illustrating the relay in contacts-closed position.
Figure 4:
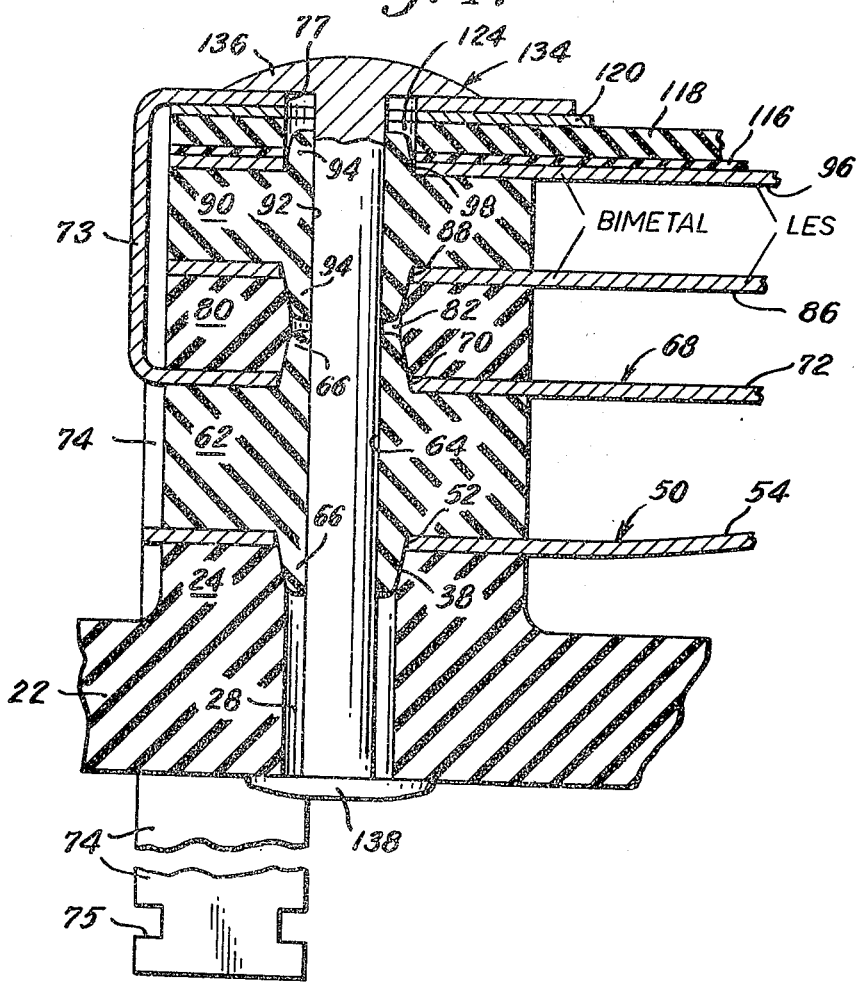
FIG. 4 is a section view to enlarged scale along line 4—4 of FIG. 3.

Referring to the drawings, 20 in FIGS. 1-6 indicates a preferred embodiment of the novel and improved relay of this invention which is particularly adapted for incorporation in an otherwise conventional color television receiver circuit for accomplishing the objectives of this invention as shown, the relay includes an insulating base 22 molded of a suitably strong, rigid and electrically insulated material such as phenolic resin or the like. The base is provided with integrally molded bosses 24 and 26 and has a bore or aperture 28 extending through the boss 24, has slot-shaped apertures 30, 32 and 34 extending through the base, and has a threaded recess 36 extending into but not through the boss 26. The bore 28 is preferably countersunk at 38 as shown in FIG. 4. Preferably blocks 40 are also integrally molded on the base at either end of the slot-shaped base aperture 34, each block having a groove 42 facing the aperture and having a shoulder 44 formed within the groove. Notches 46 and 48 are also preferably molded into the base, one at each edge of the base, the notches 46 preferably being at least partly tapered as shown in FIGS. 2 and 3.

In accordance with this invention, a resilient blade member 50 of an electrically-conductive material such as beryllium-copper is provided with a mounting aperture 52, with an elongated blade leg 54, and with an integral terminal portion 56. As illustrated, this blade member is mounted on the boss 24 so that the blade aperture 52 is aligned with the bore 28 and so that the terminal portion 56 fits into the slot-shaped base aperture 30. The blade leg 54 then extends in cantilever relation over the relay base 22 and is provided with a fixed contact 58 which is secured to the distal end of the blade leg in any conventional manner. For example, the contact 58 preferably embodies a material of high electrical conductivity such as silver and has a shank 59 which is fitted into an aperture in the blade and is enlarged for riveting the contact to the blade. The terminal portion 56 of the blade member is preferably notched at 60 to facilitate attachment of wire leads thereto. Preferably the blade leg 54 is slightly bent upwardly, as shown in FIGS. 2. A spacer 62, also formed of strong, rigid, electrically insulating material and provided with a central bore 64 and tapered hubs 66 is then fitted on top of the blade member 50 so that one spacer hub extends through the blade member aperture 52 into the countersink portion of the base bore 28, thereby to center the spacer on the boss 24 and to positively locate the blade member 50 with respect to the base.

A second blade member 68 of a resilient, electrically-conductive material, also having a mounting aperture 70, a blade leg 72, an integral connector portion 73, and an integral terminal portion 74 notched at 75, is then mounted on the spacer 62 as shown so that the blade aperture fits over the spacer hub 66 and so that the terminal portion 74 of the blade member fits into the slot-shaped aperture 32 of the base. The blade leg 72 extends in cantilever relation from the spacer 62 in spaced, overlying relation to the blade leg 54 and mounts a movable contact 76 near the distal end of the blade leg 72, the positioning of the blade aperture 70 on the hub 66 and of the terminal portion 74 in the slot 32 serving to precisely locate the blade leg 72 with respect to the blade leg 54. The connector portion of the blade member has an aperture 77 therein aligned with the member mounting aperture 70. Preferably a pair of tongues or tabs 78 are struck from the blade 72 as shown.

A spacer 80 having a central bore 82, preferably tapering from the ends of the bore towards the center of the bore as shown, is then fitted on top of the blade member 68 so that the spacer bore 82 fits over the spacer hub 66 for centering the spacers 64 and 80 with respect to each other. A strip 86 of thermally-responsive bimetallic material having an aperture 88 therein in one end is then mounted on top of the spacer 80 with the strip aperture aligned with the spacer bore 82 and with the body of the strip extending in cantilever relation from the spacer. An additional spacer 90, having a central bore 92 and tapered hubs 94, is then mounted on top of the strip with a hub fitting through the strip aperture into the spacer bore 82, the fitting of the tapered hub into the tapered bore serving to center the spacers 80 and 90 with respect to each other. A second strip 96 of thermally-responsive bimetallic material having an aperture 98 at one end thereof has its aperture fitted over the spacer hub 94, the opposite end of the strip 96 having tongues or tabs 100 struck therefrom as shown. As such thermally-responsive strips are well known in the art, they are not further described herein and it will be understood that the strips each comprise two bonded layers of materials of different coefficients of thermal expansion, the strips being adapted to flex when subjected to changes in temperature. In accordance with this invention, the strips 86 and 96 are located on the spacers 80 and 90 with their sides of relatively lower coefficients of thermal expansion (LES) facing each other so that the strips are adapted to flex in opposite directions in response to heat applied to the strips.

A link 106, preferably formed of insulating material such as fiberboard, is provided with three slots 108, and is fitted over the distal ends of the blade leg 72 and the bimetallic strips 86 and 96, the link engaging the tabs 78 and 100 struck from the blade leg 72 and the bimetallic strip 96 and preferably engaging the shoulders at 110 on the blade leg 72 and at 112 on the strip 96 for securing the link in fixed position with respect to the blade leg 72 and the bimetallic strips 86 and 96. In this construction, the link 106 connects the blade leg 72 and the bimetallic strips 86 and 96 for common, flexing movement as a single unit.

In accordance with this invention, a heater or resistor assembly 114 is mounted on the spacer 90 in overlying heat-transfer relation to the bimetallic strip member 96. As illustrated, particularly in FIG. 4, the heater assembly preferably includes a thin electrically-insulating substrate 116 formed of a plastic or mica-base material capable of continuously withstanding temperatures on the order of 275°C. A mass of heater material 118 of positive temperature coefficient of resistivity is formed upon the substrate, and heater terminations 120 and 122 are formed by plating or the like at either end of the heater assembly.

In a preferred embodiment of the invention, the resistor or heater mass 118 comprises a body of ceramic titanate material such as lanthanum-doped borium titanate which is self-heating in response to the flow of electrical current through the mass, the body displaying progressively increasing resistance as the temperature of the body increases and displaying a sharp or anomalous increase in resistance as the temperature of the body reaches a selected level, for example at a level of about 120°C. As such self-heating resiistor materials are well-known, the material is not further described herein and it will be understood that the material normally displays relatively low resistance to permit substantial current flow through the resistor, that the material displays sufficient increase in resistance as it is heated to temperatures approaching 120°C. to reduce current flow in the resistor to a very low level, and that as the material is heated to 120°C., the material displays a sharper, anomalous increase in resistance sufficient to reduce current flow in the resistor to substantially zero. The resistor then remains heated at this anomaly temperature as long as voltage is applied across the resistor. The resistor-heater terminations 120 and 122 are conventionally formed at the ends of the resistor-heater by electroless nickel plating or the like. It should be understood that other conventional heater constructions can also be used within the scope of this invention and that where the heater 114 is formed without an insulating substrate member 116, a strip of insulating material such as polyvinyl chloride film can be interposed between the heater body 118 and the strip 96 for electrically insulating the body from the strip, the insulating material being thin to minimize thermal insulating of the trip 96 from the heater.

In accordance with this invention, the heater assembly is provided with a bore 124 extending through the heater termination 120, this bore fitting over the hub 94 on the space 90 as shown in FIG. 4. The connector portion 73 of the blade member 68 is then arranged with its aperture 77 aligned with the heater bore 124 as shown. The heater termination 122 is electrically connected to a flange portion 126 of the heater terminal 128 which is notched at 129 and fitted through the slot 34 in the relay base 22. The terminal 128 is provided with a tab portion 130 partially separated from the terminal by a saw cut or slot (not shown), the tab being bent after insertion through the base slot 34 to engage the underside of the base 22. The terminal 128 is also notched to form shoulders 132 to be engaged with the shoulders 44 in the blocks 40 molded on the base 22. In this arrangement, the engagement of the shoulders 132 and the tab 130 with the base 22 firmly locates the terminal 128 with respect to the base.

An electrically conductive rivet 134, preferably formed of steel to provide suitable strength, is then inserted through the bores in the heater assembly, spacers, bimetallic strips, and contact blades as shown in FIG. 4, the rivet head 136 being firmly engaged with the connector portion 73 of the blade member 68 to hold the connector portion in firm electrical contact with the termination 120 of the heater assembly, the opposite end 138 of the rivet being enlarged to engage the underside of the base 22. The rivet and the heater terminal 128 cooperate to positively locate the heater assembly in the desired heat-transfer relation to the bimetallic strip 96 with the "hot spot" of the heater accurately positioned with respect to the strip 96. It can be seen that, in the structure above described, the members 50, 68, 86, 96, and 114 are all mounted on the post structure formed by the boss 24 on the relay base, by the spacers 62, 80 and 90, and by the rivet 134, interfitting of the spacers with the rivet and with member apertures serving to accurately locate the noted relay members with respect to each other and also to electrically insulate the blades 54 and 72, the bimetallic members 86 and 96 from each other and to hold the blade member 68 in electrical engagement with the heater assembly. Note that interfitting of the spacer hubs in spacer bores provides increased electrical creep distance between the conductive blade members and the rivet pin 134.

In accordance with this invention, an adjusting screw 142, preferably having an enlarged head, is threadedly engaged in the base recess 36 so that the screw head is adapted to engage the blade leg 54 for adjusting the position of the contact carried by the blade with respect to the contact 76 carried by the blade leg 72. For this purpose, the blade leg 54 preferably has an extending tab 144, shown particularly in FIGS. 3 and 5, this tab having a rounded dimple 146 to facilitate engagement of the leg with the screw head.

A cover 147, preferably comprising a box-like metallic housing having tabs 148 and 149 extending therefrom is then rested on top of the relay base 22 with the tabs 148 and 149 extended into the base notches 46 and 48. The tabs 148 are bent into the notches 46 for securing the cover to the base.

The relay 20 is especially adapted for use in degaussing circuits of instant-on color television receivers as is illustrated in FIG. 7. Such color television receivers conventionally include a power transformer 150 having a primary winding 152 and a secondary winding 154, the primary transformer winding being connectable through a manually operable actuating switch 156 to an alternating current source represented in FIG. 7 by the line terminals 158 and 160. The secondary transformer winding feeds a conventional power supply or voltage doubler arrangement represented by the diodes 162. The capacitor 164 and resistance 166 represent the load imposed on the power supply by the receiver circuitry and can be of any conventional design. The receiver also includes a conventional color television picture tube (not shown) which incorporates magnetically permeable material and includes conventional degaussing coil means 168 which are arranged in demagnetizing relation to the picture tube in any conventional manner. As the color television circuit can be otherwise of conventional design, the circcuit is not further described herein and it will be understood that any conventional color television circuit components adapted to provide a color television picture can be incorporated within the television circuit of this invention.

In accordance with this invention as illustrated in FIG. 7, the color television receiver circuit additionally includes the relay 20 above described which is connected at the primary side of the transformer as shown. That is, the ends of the described degaussing coil means 168 are connected to the relay terminals 56 and 74 respectively; the ends of the primary transformer winding 152 are connected to the relay terminals 56 and 128 respectively; and the relay terminals 56 and 128 are connected to the line terminals 158 and 160, the switch 156 being interposed between the terminal 56 and the line terminal 158.

In this arrangement, manual closing of the switch 156 actuates the television receiver and also energizes the degaussing coil means 168 and the relay resistor-heater 114, sufficient current flowing in the degaussing coil means for establishing a substantial magnetic field for initiating demagnetization of the magnetically permeable material in the receiver picture tube. As soon as the resistor-heater 114 is energized, the temperature of the resistor-heater begins to rise as indicated in curve $a$ in FIG. 10. Further, as the resistor-heater increases in temperature, the current flowing through the resistor-heater is gradually reduced from a peak current to a very low current level as is illustrated in curve $b$ in FIG. 9. This reduction in current flow through the resistor-heater also provides a decaying current flow through the degaussing coil means so that the magnetic field established by the degaussing coil means is progressively reduced to substantially zero in a cyclical manner, thereby to complete demagnetization of the receiver picture tube as will be understood. As the resistor-heater 114 increases in temperature, the heat thus generated is applied to the thermally-responsive bimetallic strip 96 of the relay 20 so that, as the resistor-heater temperature increases toward its anomaly temperature, the strip moves away from the heater, thereby to move the contact blade 72 to engage the movable relay contact 76 with the fixed relay contact 58 to close the relay circuit and to shunt the degaussing coil means 168. At this point, the primary voltage remains impressed across the heater 114 through the relay contacts 76 and 58 so that the heater 114 remains heated while the television receiver remains in actuated condition. When the switch 156 is manually opened for deactuating the television receiver, the voltage impressed across the heater 114 is removed and the heater cools permitting the thermally-responsive strip 96 to return to its original position and to open the relay circuit between the relay contacts 76 and 58.

It should be understood that the relay 20 described above can also be connected at the secondary winding side of the receiver transformer as illustrated in FIG. 8. That is, the relay terminal 56 is connected to one side of the transformer secondary, to one side of the voltage doubler and to one end of the degaussing coil measn 168; thereby terminal 74 is connected to the opposite end of the degaussing coil means; and the relay terminal 128 is connected to the opposite side of the transformer secondary and voltage doubler. The operation of the receiver circuit described with reference to FIG. 8 is the same as that described above with reference to FIG. 7 although, of course, a resistor-heater of different rating is required for operating at the lower voltage of transformer secondary.

The relay 20 of this invention is well suited for the purpose above described in that the relay is ambient-compensated, fast-acting, easily calibrated, adapted for long and economical service, and is of inexpensive manufacture. That is, the inexpensively arranged bimetallic strips 86 and 96 in the relay are adapted to flex in opposite directions in response to changes in the ambient temperature of the relay. This means that the link 106 does not move during ambient temperature change and assures that the relay contacts remain in open circuit position even though there may be wide variations in the ambient temperature to which the relay is subjected in a television receiver. Yet the thermally-responsive strip 96 responds to heat transferred thereto from the heater means 114 in substantially the same period of time at any ambient temperature. The strip 96 is disposed in closely spaced relation to the heater means and is accurately located with respect to the hot spot of the heater means for assuring prompt response of the strip to heat generated by the heater means. In this regard, note that degaussing of the noted television receiver will usually be completed within about 1–3 seconds and that the degaussing coil should preferably be shunted within about 4 seconds. The relay 20, although using inexpensive and easily assembled components, is readily capable of assuring shunting of the degaussing coil within this short interval. Further, the relay is easily calibrated by the adjusting screw 142 for setting any required spacing between relay contacts 76 and 58 to adjust the delay provided by the relay without subjecting the termally-responsive relay element to any forces which would interfere with proper operation of the relay.

The relay is also adapted for long and economical service life in that, the thermally-responsive strip 96 moves away from the heater means 114 when the heater is generating heat, thereby minimizing or limiting the temperatures to which the strip is subjected during operation of the television receiver. Further, because the heater increases in resistance during heating, power consumption by the heater decreases and heating effect of the heater is reduced as the heater displays its increased resistance. This assures low relay operating costs and further protects the thermally-responsive relay strip 96 from adverse heating effects. Note also that the provision of a separate current-conducting blade leg 72 movable with but electrically insulated from the thermally-responsive strip 96 assures low relay resistance in closed contacts position and avoids self-heating of the strip 96 which would occur if the strip were a current-conducting member. Resilient mounting of fixed relay contact 58 on the blade leg 54 assures the occurrence of wiping action between this contact and the movable relay contact 76 during closing of the relay contacts. This wiping action minimizes contact resistance as will be understood and assures good contact engagement which provides long contact service life. Note that adjustment of the position of the blade leg 54 by the screw 142 does not interfere with this wiping action and, in fact, provides some preloading of the resilient blade leg 54 which assures good contact pressure between the relay contacts in closed-circuit position. In the described construction, the relay 20 is characterized by convenient and accurate assembly of inexpensive components on a single post structure formed by the boss 24 on the relay base, by the spacers 62, 80 and 90, and by the rivet 134. Yet the relay provides fast and accurate operation, economical operation and long service life.

It should be understood that the improved color television receiver of this invention does not require use of a relay in the manner above-described. That is, such an improved color television receiver can be achieved by incorporating a resistor of positive temperature coefficient of resistivity in series with degaussing coil means in an otherwise conventional receiver circuit, the resistor being adapted to providing a decaying current in the degaussing coil means for accomplishing degaussing of the receiver and also being adapted to display a sharp increase in resistance after completion of such degaussing for effectively terminating current flow in the degaussing coil means.

For example, as illustrated in FIG. 11, an otherwise conventional color television receiver circuit including transformer means 150, voltage doubler means 162, and load components represented by the capacitor 164 and resistance 166 as above described can be combined with conventional degaussing coil means 168 and with a resistor 170 of positive temperature coefficient of resistivity, the coil means 168 and resistor 170 being connected in series relation to each other in parallel with the primary transformer winding 152 for example; In this receiver circuit, closure of the switch 156 energizes the transformer 150 and initiates production of a color television picture in the manner above described. When the switch 156 is initially closed, substantial current also flows through the degaussing coil means 168 and the resistor 170 as illustrated in FIG. 11. As the current flow in the resistor 170 heats the resistor, the resulting increase in resistance reduces current flow through the degaussing coil means for accomplishing degaussing of any mangetically permeable materials in the television receiver as will be understood. During this reduction in degaussing coil current, the resistor 170 is further heated until it reaches its anomaly temperature at which time the resistance of the resistor sharply increases as above described to reduce current flow in the degaussing coil means to an insignificant level, thereby to effectively remove the degaussing coil means from the television receiver circuit.

Alternatively, the described degaussing coil means and resistor 170 can be connected in series relation to each other in parallel with the secondary winding 154 of the color television receiver as illustrated in FIG. 12 within the scope of this invention. It will also be understood that the described degaussing coil means and resistor of positive temperature coefficient of resistivity can be combined with other time delay relay means actuable to remove the degaussing coil means from the television receiver circuit after completion of receiver degaussing within the scope of this invention.

It should be understood that although particular embodiments of the television receiver circuit and of the time delay relay of this invention have been described by way of illustration, the invention includes all modifications and equivalents thereof falling within the scope of the appended claims.

We claim:

1. In combination with a color television receiver having picture-tube means embodying magnetically permeable material which tends to become undesirably magnetized, a power supply for said picture-tube means, and a switch actuable to connect said power supply to an alternating current source for energizing said power supply, a degaussing coil disposed in demagnetizing relation to said material, self-heating resistor means of positive temperature coefficient of resistivity connected in series with said coil to be energized with said power supply to permit current in said coil for initiating demagnetizing of said material and to heat said resistor means for progressively reducing current in said coil to demagnetize said material, and thermally responsive relay means actuable in response to increase in temperature of said resistor means for shunting said coil a selected period of time after energization of said power supply.

2. The combination as set forth in claim 1 wherein said resistor means displays a sharp, anomalous increase in resistance when heated to a selected temperature for substantially reducing current in said resistor means.

3. The combination as set forth in claim 2 wherein said relay means are actuable in response to increase in temperature of said resistor means to substantially said selected temperature.

4. The combination as set forth in claim 1 wherein said power supply comprises transformer means having primary and secondary windings and wherein said coil and resistor means are connected in series relation to each other across one of said transformer windings.

5. The combination as set forth in claim 4 wherein said coil and resistor means are connected across said primary transformer winding.

6. The combination as set forth in claim 4 wherein said coil and resistor means are connected across said secondary transformer winding.

7. In combination with a color television receiver having picture-tube means embodying magnetically permeable material which tends to become undesirably magnetized, a power supply comprising transformer means having primary and secondary windings, and switch means actuable to connect said primary transformer winding to an alternating current source for energizing said windings, a degaussing coil disposed in demagnetizing relation to said material, self-heating resistor means of positive temperature coefficient of resistivity which displays a sharp, anomalous increase in resistance when heated to a selected temperature, said coil and resistor means being connected in series relation to each other across one of said transformer windings to be energized with said winding to permit current flow in said coil for initiating demagnetization of said material and to heat said resistor means to said selected temperature for progressively reducing current in said coil to substantially zero to demagnetize said material, and time-delay relay means connected in parallel with said coil and in series with said resistor means, and relay means having a thermally-responsive bimetallic strip mounted in heat-transfer relation to said resistor means and actuable in response to increase in temperature of said resistor means to said selected temperature for shunting said coil a selected period of time after energization of said transformer windings.

* * * * *